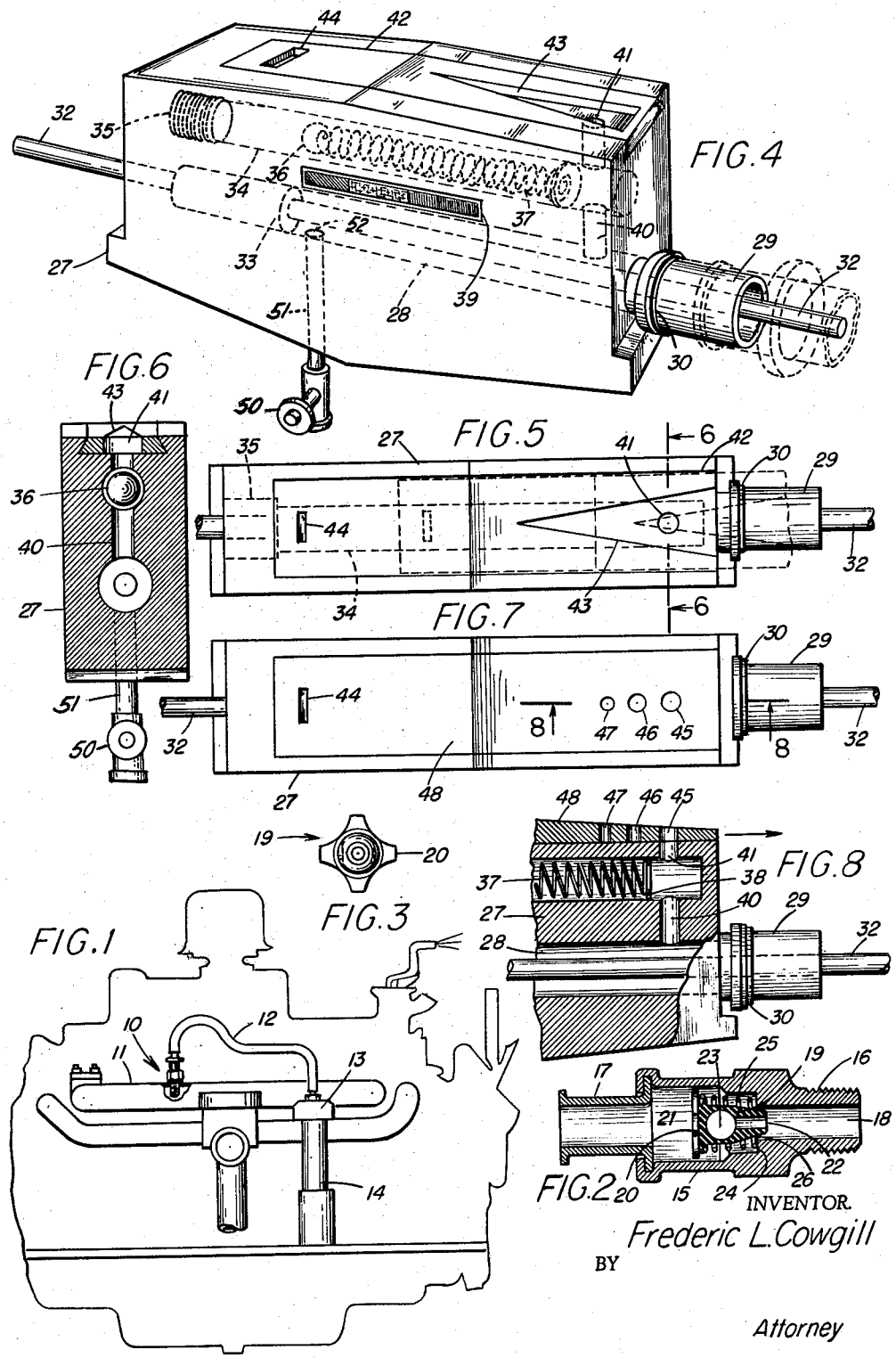

3,147,611
VALVE TESTING APPARATUS

Frederic L. Cowgill, Paulsboro, N.J., assignor to Socony Mobil Oil Company, Inc., a corporation of New York Filed July 6, 1962, Ser. No. 208,132

14 Claims. (Cl. 73—4)

The present invention relates to an improved device for testing gas or other fluid control valves and, more particularly, automatic vacuum control valves such as crankcase breather valves under conditions that very closely simulate actual operating conditions and, still more particularly, for testing valves of the automatic vacuum control type proposed for use in systems for controlling discharge by automotive engines of smog-producing components arising in the crankcase of such engines. The device of this invention is, as is more fully described hereafter, further adapted for testing the control valve itself as well as the conduit (e.g., breather hose) that normally connects the crankcase to the control valve whereby not only is the valve itself tested for operability but, additionally, such a conduit can also be tested to determine whether or not it is plugged as well as the degree of plugging.

This application is a continuation-in-part of my copending application, Serial No. 95,281, filed March 13, 1961, entitled "Valve Testing Apparatus."

The pollution of the atmosphere by smog has become a serious problem in certain cities, and substantial efforts are being made to alleviate this undesirable and unhealthy contamination of the air. One of the suspected causes of smog is the fumes or vapors given off by the crankcases of internal combustion engines, chiefly automobile engines. An effective method of eliminating or at least minimizing this source of smog is to ventilate the crankcase through the intake manifold of the engine. By connecting a small tubing between the intake manifold and any point on the crankcase, as for instance the oil filler cap, suction is applied to the crankcase which draws a current of air therethrough carrying all of the gases, vapors and mists in the crankcase to the intake manifold. All new automobiles sold in one state are now required by statute to have operative systems for thus ventilating the crankcases.

In adopting such a ventilating system it has been found necessary to install a control valve in the line between the crankcase and the intake manifold to avoid extreme maladjustment of the fuel-air ratio in the intake manifold. Suitable automatic vacuum control valves have been developed for the purpose and are commonly known as crankcase breather valves or as fuel reclaimers.

Crankcase breather valves have metering orifices of relatively small size and also utilize moving parts, springs and the like. In addition they must operate under very difficult conditions including extremes of high and low temperatures and much vibration while accurately regulating the passage of a mixture of gases and mists that include acidic compounds, water vapor, combustion products, light and heavy hydrocarbon vapors and dispersions of small droplets of oil in air as well as gum forming components. Despite this, it is imperative that these valves operate properly. This is important not only from considerations of public health and compliance with the law but also to insure proper and economical engine performance. Accordingly there is a distinct need for a testing device which will test these crankcase breather devices under substantially the same conditions as in their actual operation of ventilating automobile crankcases while also being adapted to test the conduit (e.g., tubing) that connects the crankcase to the breather valve.

An object of the present invention is to provide a testing device for control valve systems.

A further object of the invention is to provide a simple and rugged device for testing automatic control valve systems.

A further object of the invention is to provide an apparatus for testing gas control valve systems which is simple and reliable.

Still another object of the invention is to provide apparatus for testing crankcase breather valve systems which is positive in action, simple to use, and substantially shows the actual degree of efficiency of the valve under closely simulated operating conditions.

Still another object is to provide such a device adapted for testing automatic control valves and feed lines thereto.

Other objects and advantages of the invention will be apparent to those skilled in the art from the detailed description herein below.

In general, the testing device of this invention comprises a body provided with a conduit adapted for connection to a fluid control valve, a first passage in the body having one section in communication with a first fluid source (e.g., the atmosphere) other than the fluid normally passed to said valve and another section in communication with said conduit, a pressure responsive member resiliently mounted in said passage, a fluid bleeder means connecting said conduit with said first fluid source for controlling the pressure drop of fluid flowing through the body, and a second passage means having one end portion in communication with said conduit and another portion adapted for connection to the normal source of fluid flow (e.g., crankcase breather hose) to said valve.

In such a device, the pressure responsive member is adapted to indicate by proportional movement the pressure differential between a fluid source, such as the atmosphere, and the interior of the valve during tests under conditions approximating actual use, and the said second conduit, adapted for connection to, for example, a hose that normally connects the valve to a crankcase breather, is adapted for testing said hose to determine whether or not it is plugged and to what extent. Other aspects of the device embodied herein include a follower reciprocably mounted in said second conduit for determining the position of a movable element of said valve, a bleeder control means, for example, a slidable gate or an orificed member, for selectively restricting the flow of fluid through the bleeder means to regulate the pressure drop through the valve testing device, a transparent body for the device to permit usual observation of the position of the pressure responsive device and of the follower, and an index scale on the body of the device to facilitate such observations.

In reference to the aspects of the apparatus embodied herein for testing whether or not, and to what degree, the normal source of fluid flow to the valve may be plugged, and illustrated by reference to a system including an automotive engine having an automatic crankcase breather valve connected by means of a hose to the crankcase, the apparatus embodied herein, in illustrative embodiment, is provided in the body thereof with a conduit adapted for connection to the crankcase breather hose under test and to a crankcase breather valve, a passage in the body having one section in communication with a fluid source and another section in communication with the conduit, a pressure responsive member resiliently mounted in the passage, and a fluid bleeder means connecting the conduit with the fluid source for controlling the pressure drop of fluid flowing through the body. As is described more fully hereafter, this enables the pressure responsive member to indicate by proportional movement the degree of plugging of the crankcase breather hose.

For a better understanding of the nature and objects of this invention, reference should be had to the accompanying drawings which illustrate its principles and are not to be construed as restrictions or limitations on its scope.

FIGURE 1 is a skeleton elevation showing a typical installation of a crankcase breather valve;

FIGURE 2 is an axial section of a crankcase breather valve which may be tested with the novel valve testing device;

FIGURE 3 is an elevation of a throttling element of the valve of FIGURE 2;

FIGURE 4 is a perspective view of the testing device of the present invention;

FIGURE 5 is a plan view of the device of FIGURE 4;

FIGURE 6 is a sectional elevation taken on the line 6—6 of FIGURE 5;

FIGURE 7 is a plan view of a modification of the novel testing device; and

FIGURE 8 is a fragmentary vertical section, partly in elevation, taken on center line 8—8 of the modification of FIGURE 7.

To facilitate the understanding of the present invention, the valves which it is designed to test will be described first in order that one may appreciate fully the functions of the new valve testing device.

In FIGURE 1 the crankcase breather valve 10 is shown attached to the intake manifold 11 of an automobile engine. The flexible tubing 12 connects the inlet of the breather valve to the cap 13 on the oil filler tube 14 which leads into the crankcase of the engine. When the valve tester of the present invention is employed for checking the operation of the breather valve with the engine running, the tubing 12 is removed from the inlet of valve 10 and the present testing device is connected to the valve inlet.

The crankcase breather valve 10 of FIGURE 2 is a spring-loaded automatic throttling valve designed to partially close and restrict the air flow therethrough when the pressure differential across the valve increases and to open as the pressure differential decreases. Such action is necessary to obtain proper engine performance because a valve of fixed orifice size would allow too much air and crankcase fumes to flow therethrough under idling conditions of high vacuum in the intake manifold (low absolute pressure) if the valve orifice were properly sized for engine speeds corresponding to normal highway speeds, wherein there is a low vacuum or high manifold pressure due to the substantial opening of the carburetor throttle valve. This problem is, of course, complicated by the fact that the quantity of fuel and air passing through the intake manifold of an idling engine is relatively small and therefore the engine is readily subject to stalling upon the introduction of an excessive amount of air. Conversely, with a breather valve having a fixed orifice of the proper size for idling conditions, as the vacuum pressure decreases upon opening the throttle to accelerate to highway speeds, the lower vacuum in the manifold would draw very little air and vapors through the crankcase breather valve and thus decrease the ventilation of the crankcase at the very time that more ventilation would be required to remove the greater volume of fumes produced at the higher engine speed.

The valve of FIGURE 2 has a body 15 provided with a threaded outlet 16 adapted to be screwed into a tapped hole (not shown) extending through the wall of the intake manifold. An inlet tube 17 is crimped into the body of the valve. The bore 18 of the outlet is restricted by a resiliency mounted throttling plug 19 of hollow truncated conical shape which extends partially into the outlet passage. This plug is maintained in alignment with the outlet by means of a slidable spacing web or spider 20 at the end of the plug riding in the central bore 21 of the valve. It will be noted from FIGURE 3 that portions of this web are cut away to permit the flow of gas and vapors therethrough. There are two passages in the body of the plug; a longitudinal bore 22 of small diameter and a transverse bore 23 of larger diameter. The transverse bore is so located that it is in communication with the inlet at all times even when the throttling plug is seated on the shoulder 24 of the outlet orifice. A helical spring 25 seated on the shoulder 24 bears against the web 20 of the plug thereby holding the plug in the proper position for automatically controlling the flow of gases therethrough. This spring also cooperates with web 20 in keeping plug 19 aligned with outlet passage 18.

When there is a low vacuum (relatively high absolute pressure) in the manifold at normal engine speeds, the spring holds the plug in the open position shown in FIGURE 2 and provides the minimum restriction to flow through the control valve. Flowing gases pass through the annular area between the conical section 26 of the plug and the adjacent shoulder 24 as well as through the transverse and longitudinal bores 22 and 23 within the throttling plug. As the vacuum in the intake manifold increases when the carburetor throttle valve closes, the pressure differential across the breather valve 10 moves the throttling plug 19 toward the outlet orifice thereby bringing the conical surface 26 closer to shoulder 24 and reducing the effective aperture in the valve. When the manifold vacuum is at its maximum (lowest absolute pressure) with the engine idling, the surface 26 may seat on shoulder 24 thereby reducing the effective outlet orifice size to that of the longitudinal bore 22. This automatic reduction of the effective cross section of the breather valve restricts the flow of air and crankcase fumes therethrough to amounts which, at the high pressure differential then applied, will not alter the vaporized gasoline-air mixture in the intake manifold sufficiently to affect the idling engine but are still large enough to thoroughly ventilate the crankcase.

As previously indicated this crankcase breather valve operates under difficult conditions of vibration and temperature changes with corrosive and gum forming materials passing therethrough. For proper maintenance such valves should be tested at suitable intervals and desirably under conditions which closely approximate the operating conditions. Compressing the plug valve spring with a probing device is not an adequate test because the probe could easily move a throttling plug which sticks under normal operating conditions, and moreover would not indicate the condition of either the outlet passage or those passages in the throttling plug. Merely blowing air through the valve would only show that the outlet was at least partially open without indicating the actual condition of the internal passages or even detecting an inoperative throttling plug 19.

The valve testing apparatus of the present invention illustrated in FIGURES 4 to 8, inclusive, is capable of providing complete, rapid and reliable tests of the full operation of these crankcase breather valves on running engines and the breather hose for plugging.

Turning now to FIGURE 4, the body 27 of the valve testing device may be made of any suitable shape and of any suitable material. Although close fits are not required in this apparatus it is desirable to employ a material which is relatively easy to machine or to mold or cast. A suitable transparent plastic such as polymethylmethacrylate is greatly preferred, since it meets these qualifications and furthermore is transparent, thereby permitting visual observation of the indicating elements therein. There are several passageways in the tester body which are preferably but not necessarily of circular cross section for ease of fabrication.

A horizontal conduit 28 extends completely through the length of the body 27 into a connecting tube 29 which is slipped into the inlet 17 of the crankcase breather valve 10 under test as shown schematically in FIGURE 4. The inlet of the valve is held firmly seated against the rubber washer 30 to prevent leakage. In a typical embodiment, the diameter of conduit 28 is 0.250 inch. A spool-shaped follower piston 33 is coaxially affixed to or integral with the rod near the middle of the rod. This rod is of sufficient length to project beyond the connecting tube 29 into the breather valve under test in order to sense or determine the position of the throttling plug at any instant. Piston 33 has a maximum diameter of 0.240 inch to provide an easy sliding fit in conduit 28 and is desirably opaque or painted so that it may be seen through the transparent body. As is further shown in FIGURE 4, a passage 51 is provided to connect conduit 28 to a valve 50 adapted for connecting to a crankcase breather hose, such as hose 12 (FIGURE 1) at the end portion of the hose disconnected from breather valve 10 of FIGURE 1.

A passage 34 of 0.265 inch diameter has one end open to the atmosphere either fully or preferably through a 0.188 inch diameter orifice in the retainer plug 35. A pressure responsive member 36 in the form of a ball, or alternatively a suitably shaped piston, attached to the very light helical spring 37 serves to indicate the pressure differential between the atmosphere and the interior of the valve 10 while testing. Spring 37 is shown seated against the split ring 38 in the passage but it may be seated against the closed end of the passage if desired. While the ball 36 may range in size up to the maximum that will permit a relatively free sliding fit in passage 34, good results have been obtained with an extremely loose fit using a ball of 0.210 inch diameter thereby permitting a major portion of the volume of air flowing through the valve tester to enter the passage through hollow retainer plug 35 and pass around the pressure responsive ball. The retainer plug is not an essential feature of the novel device but is useful in preventing loss of the ball and spring due to rough handling. It is also desirable to use an opaque or colored ball so that it may be seen more easily through the transparent body 27. For more precise observation and recollection of the position of the pressure indicating ball 36 and the follower piston 33, a multicolored index scale 39 is mounted or painted on one or more sides of the tester body in parallel alignment to both passage 34 and the conduit 28.

A vertical bore 40 of 0.125 inch diameter communicates between the passage 34 and the conduit 28 on the low pressure or suction side of both the ball and of the follower piston 33.

In addition there is a short fluid bleeder channel 41 of 0.125 inch diameter adapted for selective communication between the atmosphere and the suction or closed end of the passage 34. To regulate the flow of air or other fluid through the bleeder channel, a sliding gate 42 is dovetailed into the top of the valve tester body. This gate, which is provided with a tapered V-shaped opening 43, may be moved to any selected position across the open end of the bleeder channel 41 to limit the effective cross sectional area of the channel to any desired extent. A recess 44 in the exposed face of the gate permits it to be readily moved to the desired position by pushing with a thumb nail. FIGURE 6 illustrates the gate in both retracted and advanced positions, using dotted lines for the latter.

Another modification of the slidable gate is illustrated in FIGURE 7 wherein a graduated series of orifices 45, 46 and 47 is provided in gate 48. In this version, orifice 45 may have the same cross sectional area as bleeder channel 41 while the areas of orifices 46 and 47 are desirably one-half and one-quarter of the area of the channel. The adjustable bleeder is provided to calibrate the tester with respect to different models of valves to be tested. The bore 22 is varied in size in different models of valve and the tester is generally set to provide a bleeder orifice corresponding in diameter to the diameter of bore 22 of the valve tested. Suitable indicia may be placed on the gate 42 and adjacent surfaces of body 27 to indicate calibrating positions of the gate.

This adjustable fluid bleeder means has several additional functional effects available at the option of the operator. First, it permits regulating the air flow to avoid or minimize any excessive pressure drop through the testing device, thereby closely simulating actual operating conditions wherein the inlet of the valve is connected by tubing 12 to a crankcase rather than the testing device. It will be appreciated that a lower than normal pressure in the central chamber 21 of the breather valve 10 for any selected engine speed will allow the throttling plug 19 to move to an abnormal position somewhat further away from its seat on shoulder 24 thereby reducing the significance of the test results. Secondly, the adjustable bleeder feature provides for adjusting the pressure differential across the ball indicator 36 properly relative to the strength of spring 37 and setting the ball in a suitable location along the index scale 39. Control of the air flow through this bypass or bleeder unit also allows the operator to compensate for the influence of gravity so that the testing device may be held horizontally, vertically or in any position which may be required by the position of the inlet of the breather valve 10. It is readily apparent that the pressure indicating ball will act somewhat differently when hanging vertically from the spring than when located vertically above that spring or when the spring is horizontal. The controlled air bleed allows for adequate compensation for these effects. While such compensation probably affects the observed results to some extent, absolute values are not required here, for relative indications are sufficient to determine the degree of operating efficiency of the valve being tested.

Operation of the testing device of the present invention, for testing of the breather valve, is quite simple and requires no particular skill other than a general understanding of the operation of internal combustion engines. For testing the valve, valve 50 is closed and the tester is merely connected to crankcase breather valve 10 firmly to prevent leakage after the tube 12 has been removed from the inlet of the valve. Then the engine is operated at a speed corresponding to customary turnpike speeds, say 2500 r.p.m., and the adjustable gate 42 is moved to bring the indicator ball to approximately the center of the scale 39 if possible. Failure to accomplish this is an indication that the valve under test is blocked and requires cleaning or replacement. After noting the positions of both the ball 36 and the follower piston 33, the operator may next test the valve at an engine speed of 1200–1500 r.p.m. to approximate city or suburban driving conditions and again note the positions of the two indicating elements. A slight movement of each is permissible with such reduction in engine speed. Finally the engine speed should be dropped to an idle in order to determine the performance of the breathing valve under high vacuum conditions. Here the ball should remain in approximately the same location whereas a distinct movement of the follower piston 32 toward valve 10 should be observed inasmuch as the throttling plug 19 should either seat on or closely approach the orifice shoulder 24. These tests can be performed in a matter of minutes to reliably indicate to an unskilled operator the efficiency of the crankcase breather valve over a suitable range of engine speeds.

In operating the device for testing the valve with valve 50 being closed, a significant portion of the air flowing through the device passes around the ball 36 when the dimensions suggested herein are used. However, a much closer fitting ball or piston may be used in the passage 34 if desired and the major portion of the air would then be admitted through bleeder channel 41, in which case a channel of larger cross section would probably be desirable. Regardless of which is used, the ball indicator is the element which shows the relative subatmospheric pressure existing at the inlet of the breather valve in use. The displacement of this ball from its rest position against the resistance of coil spring 37 is proportional to the pressure difference between the atmosphere and the interior of the valve under test. Once adjusted to a suitable position along the indicator scale the ball should not move much with variations in the engine speed when calibrated in the manner described above. It will be readily seen that other techniques of using the tester are possible and the invention is to be understood to contemplate such variations, one of the values of the device being its flexibility in use.

A minor portion of the air flowing through the valve testing device enters the conduit 28 and provides a slightly higher pressure of the adjacent face of follower piston 33 which pushes the entire follower assembly toward the valve under test. This maintains one end of follower rod 32 in light contact with the throttling plug web 20 enabling it to sense the position of the plug at various engine speeds and intake manifold pressures. A follower piston of relatively small diameter should be used to avoid producing an excessive force which would tend to displace the throttling plug from its normal operating position for the given engine speed. Of course, it is a simple matter for the operator to pull the follower rod and hold it out of contact with the throttling plug if he suspects that the follower rod is affecting the performance of the throttling element. The follower unit may also be used manually as a probe for determining relative to the indicator scale whether the throttling plug has a full range of free travel and also whether the throttling plug spring 25 is broken.

In operation of the apparatus embodied herein as aforedescribed for testing the breather valve, the apparatus is used with valve 50 being closed. Under the corrosive and gum forming conditions associated with affluents from crankcases of automotive engines, proper maintenance of the crankcase breather system also requires a periodic test of the breather hose for plugging. For such a purpose, operation of the apparatus embodied herein is described with reference to the drawings, and particularly, FIGURES 4 and 6.

In those drawings, there is shown a conduit 51 that extends into the body 27 and connects with the conduit 28 at a point between the follower piston 33 and the connecting tube 29, and preferably, when the follower piston 33 is in a position as far from the connecting tube 29 as possible.

When it is desired to test a crankcase breather hose for plugging, the hose is detached from the breather valve and is connected to the conduit 51 via the intake side of valve 50. With valve 50 open, and conduit 29 connected to the breather valve, the follower piston 33 is held away from the connecting tube 29 to the extent that it does not impede fluid flow from conduit 51 at opening 52 into conduit 28 and conduit 29.

In such an operation for testing the breather hose, the pressure responsive member 36 in the passage 34 indicates the pressure differential between the atmosphere and the conduit 28. This pressure differential is communicated between the passage 34 and the conduit 28 by the vertical bore 40. When the breather hose being tested is plugged, this pressure differential will be greater than when it is not plugged, since crankcase pressure normally approximates atmospheric pressure and pressure on the manifold side of the crankcase breather valve 10 is normally subatmospheric. Thus the extent of plugging of a breather hose being tested can be observed from a comparison of the displacement of the pressure responsive member 36 during the test and its displacement when a clean breather hose is substituted for the one being tested.

The short fluid bleeder channel 41 is adapted for selective communication between the atmosphere and the suction or closed end of the passage 34. The flow of air or other fluid through the bleeder channel 41 can be regulated by moving the sliding gate 42 to any selected position across the open end of bleeder channel 41 to limit the effective cross sectional area of the channel to any extent. The use of sliding gate positions selected for their relation to the fluid flow capacity of the breather valve of the crankcase breather system being tested permits a quantitative measurement of breather hose plugging by observation of the displacement of the pressure responsive member 36 from rest position.

The slidable gate modification illustrated in FIGURE 7 also permits such quantitative measurements by selection of one of the series of orifices 45, 46, and 47 in gate 48 for the relation of its cross-sectional area to that of the crankcase breather valve bore 18.

Thus the extent of plugging of a breather hose can be observed in relation to a clean breather hose, either by direct comparison or by prior calibration of the tester with a clean breather hose, or quantitatively by prior quantitative calibrations with breather hoses whose extent of plugging was known.

In further reference to the device, and in particular the embodiment shown in FIGURE 4, it has been set forth that the conduit 51 is so disposed that, with valve 50 open and connected to the breather hose, flow of crankcase atmosphere through conduit 51 into conduit 28 should not be impeded from continued passage into conduit 29. That requires that piston 33 should be so disposed in relation to rod 32 that rod 32 can be pulled in a direction away from the conduit 29 so that the outlet of conduit 51 into conduit 28 is then between piston 33 and conduit 29. Preferably, however, conduit 51 is disposed such that its outlet into conduit 28 is between piston 33 and conduit 29 and adjacent to piston 33 when rod 32 is pulled in a direction away from conduit 29 until piston 33 bears against the rear wall of body 27.

Furthermore, and although the device has been described with respect to the embodiment shown in FIGURES 4 to 8 using a slidable gate for control of the bleeder means, it should be understood that other control means can be satisfactorily used. An example of such other means is a rotary orifice selector having circumferentially disposed vertical openings such that the orifice selector can be rotated to bring into registry with bleeder means 41 an opening of desired size.

While the apparatus of this invention has been described in its application to the testing a single specific type of vacuum control valve it may be used or adapted for testing other valves capable of controlling liquids or gases under a wide range of higher pressures by suitable modifications known to those skilled in the art. The dimensions given hereinabove are exemplary and will facilitate the understanding and construction of the novel device; however, it is to be understood that considerable departures therefrom may be made to suit particular needs. Moreover, it will be apparent to those skilled in the art that many other modifications can be made in the shape and structure of the novel device. Accordingly, the detailed description hereinabove is to be interpreted as illustrative and not in a limiting fashion.

I claim:

1. A device for testing fluid control valve systems comprising a body provided with a conduit adapted for connection to a fluid control valve, a first passage in the body having one section in communication with a first fluid source other than the fluid normally passed to said valve and another section in communication with said conduit, a pressure responsive member resiliently mounted in said passage, a bleeder means connecting said conduit with said first fluid source for controlling the pressure drop of fluid flowing through the body, and a second passage means having one end portion in communication with said conduit and another portion adapted for connection to the normal source of fluid flow to said valve for testing said normal source of fluid flow for blockage.

2. A device, as defined in claim 1, wherein the bleeder means is adjustable.

3. A device, as defined in claim 1, comprising a follower reciprocably mounted in said second passage and extending therebeyond for sensing the position of a movable element of said valve.

4. A device, as defined in claim 1, comprising a pressure driven follower reciprocably mounted in said second passage and extending therebeyond for continuously sensing and indicating the position of a movable element of said valve during test under simulated valve operating conditions.

5. A device, as defined in claim 1, in which the fluid bleeder means comprises a channel in the body and a movable gate for selectively restricting the flow of fluid through the channel.

6. A device, as defined in claim 5, in which the gate is slidably mounted and provided with a tapered opening.

7. A device, as defined in claim 5, in which the gate is slidably mounted and provided with a graduated series of orifices of decreasing diameters.

8. A device, as defined in claim 1, in which the first passage and the pressure responsive member are of substantially circular cross section with a loose fit therebetween and the resilient mounting comprises a helical spring, whereby at least a portion of the fluid flow through the device induced by a pressure differential flows past the pressure responsive member.

9. A device, as defined in claim 1, which also comprises means for determining the position of the pressure responsive member.

10. A device, as defined in claim 1, in which the body is constructed of a transparent material, thereby permitting visual observation of the position of the pressure responsive member.

11. A device, as defined in claim 1, in which the body is constructed of a transparent material and provided with a scale aligned substantially parallel to the first passage, thereby permitting visual observation of the position of the pressure responsive member relative to the scale.

12. A device for testing an automatic vacuum control valve system comprising a body provided with a conduit adapted for connection to said valve, an air pressure driven follower reciprocably mounted in the conduit and extending therebeyond for continuously sensing and indicating the position of a movable element of said valve, an air bleeder channel in the body communicating with the atmosphere, a passage in said body having one end in substantially free communication with the atmosphere and another end in communication with both the conduit and the air bleeder channel, a pressure responsive member resiliently mounted in said passage, a second passage in said body having one end portion in communication with said conduit and adapted for connection at the other end to the normal source of fluid flow to said valve.

13. A device, as defined in claim 12, comprising adjustable means for selectively controlling the flow of air through the bleeder channel.

14. A device for testing an automatic vacuum control valve system, such as a system comprising an automatic vacuum control valve normally connected to the intake manifold of an automotive engine and to a crankcase breather hose therein for controlling passage of crankcase effluent into said intake manifold, comprising a body provided with a conduit adapted for connection to said valve, an air pressure driven follower reciprocably mounted in the conduit and extending therebeyond for continuously sensing and indicating the position of a movable element of said valve, an air bleeder channel in the body communicating with the atmosphere, a passage in said body having one end in substantially free communication with the atmosphere and another end in communication with both the conduit and the air bleeder channel, a pressure responsive member resiliently mounted in said passage, and another passage in said body that has one end portion in communication with said conduit and its other end portion adapted for connection to a crankcase breather hose, said device being further characterized in that said follower is positionable in said conduit such that, when said other passage is in communication with said crankcase breather hose, said follower does not prevent fluid flow from said other passage into the end portion of said conduit adapted for connection to said valve.

References Cited in the file of this patent
UNITED STATES PATENTS

| | | |
|---|---|---|
| 2,850,897 | Main | Sept. 9, 1958 |
| 2,858,697 | Entwistle | Nov. 4, 1958 |
| 3,024,655 | Dwyer et al. | Mar. 13, 1962 |
| 3,077,762 | Cowgill | Feb. 19, 1963 |